United States Patent
Fredley et al.

(10) Patent No.: US 7,100,376 B2
(45) Date of Patent: Sep. 5, 2006

(54) FUEL CELL IN COMBINED HEAT AND ELECTRIC POWER SYSTEM

(75) Inventors: Robert R. Fredley, Tolland, CT (US); Bhimashankar V. Nitta, Ellington, CT (US)

(73) Assignee: UTC Fuel Cells, LLC, South Windsor, CT (US)

( * ) Notice: Subject to any disclaimer, the term of this patent is extended or adjusted under 35 U.S.C. 154(b) by 0 days.

(21) Appl. No.: 11/025,209

(22) Filed: Dec. 29, 2004

(65) Prior Publication Data

US 2006/0137350 A1    Jun. 29, 2006

(51) Int. Cl.
*F01K 13/00*    (2006.01)
*H01M 8/06*    (2006.01)

(52) U.S. Cl. ............................ 60/645; 60/670; 429/12; 429/26

(58) Field of Classification Search .................. 60/645, 60/670; 429/12, 13, 19, 20, 26
See application file for complete search history.

(56) References Cited

U.S. PATENT DOCUMENTS

| | | | |
|---|---|---|---|
| 6,361,891 B1 * | 3/2002 | Breault et al. ................ | 429/26 |
| 6,376,114 B1 * | 4/2002 | Bonville et al. .............. | 429/19 |
| 6,416,891 B1 * | 7/2002 | Condit et al. ................. | 429/13 |
| 6,926,979 B1 * | 8/2005 | Cao ............................ | 429/12 |
| 6,939,635 B1 * | 9/2005 | Ballantine et al. ............ | 429/24 |
| 2003/0044662 A1 * | 3/2003 | Walsh ......................... | 429/26 |

* cited by examiner

*Primary Examiner*—Hoang Nguyen
(74) *Attorney, Agent, or Firm*—M. P. Williams

(57) ABSTRACT

A fuel cell system having a fuel cell stack (9) employs a group of fuel cells between corresponding cooler plates (55). The system utilizes single phase coolant, the outflow of the coolant plates (55) being divided into a flow (78) just sufficient to provide adequate steam (68, 79) to a fuel reformer (58), the remainder of the coolant outlet flowing (76) directly to heat recovery and utilization apparatus (77), which may include fuel cell power plant accessories (85), such as chillers or boilers.

3 Claims, 2 Drawing Sheets

FUEL CELL IN COMBINED HEAT AND ELECTRIC POWER SYSTEM

TECHNICAL FIELD

This invention relates to a system which converts fuel to useable heat and electric power, employing fuel cells which use single phase coolant. The outflow of single phase coolant (i.e., water) from the cooler plates is divided: an amount sufficient for a fuel processing system is flashed to make steam for a fuel reformer, the remaining outflow comprising a high grade source of heat for heat recovery and utilization apparatus.

BACKGROUND ART

In a known fuel cell system employing phosphoric acid electrolyte, cooler plates interposed between groups of fuel cells have a simple serpentine cooler flow path and utilize water coolant. Liquid water enters the cooler plates and a two-phase, water/steam mixture exits the cooler plates. A small fraction of the heat removal is due to increasing the sensible heat of the water as it increases to its boiling temperature, and a major fraction of heat removal is due to the latent heat of evaporation of liquid water to steam. U.S. Pat. No. 3,969,145 describes such a coolant system.

As is known, the pressure drop across a typical cooler is diatonic if the inlet pressure is such that at some coolant flow rate and resulting pressure drop and temperature rise vapor is produced. Because the pressure drop characteristic is diatonic there are three flow rates that give the same pressure drop, one that is low flow with high vapor content, one that is moderate flow with lower vapor content, and one that is high flow with no vapor content. This means that in a typical coolant manifold design that attempts to minimize the pressure variation in the inlet and exit manifolds, the flow to any of more than 30 cooler plates could be any one of the three coolant flow rates that give the desired pressure difference between the coolant manifolds. Typical cooler plates want to run at a moderate flow rate that gives a low quality (low vapor content) two phase flow. The potential variation in flow rates between more than 30 cooler plates would result in temperature variations, and therefore performance variations which are undesirable.

A seemingly simple solution to this problem is the use of flow control devices, which basically raise the total pressure across each cooler plate so as to provide a pressure/flow characteristic which is monotonic. This may be done with flow restriction orifices as in U.S. Pat. No. 4,923,767; flow control devices which comprise tortuous flow path coolant tubes are disclosed in U.S. Pat. No. 4,574,112.

The cooler to cooler flow distribution problems associated with generating a vapor phase in the coolers can be avoided if the coolers were run in a single phase mode, in this case all liquid flow. This is because in the range of flows associated with all liquid flow the pressure drop characteristic is monotonic. The advantages of a single phase coolant, however, are offset by the need to provide steam for fuel processing (such as a conventional reformer), in order to generate fuel for the fuel cell stack.

The benefit of single phase flow versus two phase flow can be seen in the example illustrated in FIG. 1. The coolant flow ranges from a low of 80 pounds per hour (pph) (36 kgm/hr) to a high of 350 pph (158 kgm/hr) for the two phase flow case without flow control devices. Fifty percent of the coolant flows through seven of the thirty-three coolers. The cells adjacent to low flow coolers will have a higher than desired temperature as a consequence of the low coolant flow. This will lead to a more rapid performance decay, a higher acid loss rate and a reduced cell stack life.

The coolant flow ranges from a low of 150 pph (66 kgm/hr) to a high of 210 pph (95 kgm/hr) for the two phase flow case with flow control devices. This improved flow uniformity results in an increased life at the expense of installing flow control devices on each cooler.

However, the flow distribution for a single phase coolant is very uniform at about 190 pph (86 kgm/hr) without the added cost of complicated flow restriction devices.

The flow control devices increase the cost of fuel cell stacks and present a reliability problem, due to the potential for the distribution devices to become plugged after extended operation.

DISCLOSURE OF INVENTION

Objects of the invention include: eliminating the need for complex flow distribution devices at the coolant inlets of a fuel cell stack; reduced parasitic power in a combined heat and electric power system; simple provision of steam to a fuel cell fuel processor while realizing the benefits of single phase fuel cell coolant; and improved heat recovery in a combined heat and electric power system.

According to the present invention, a fuel cell stack is fed reformate gas from a reformer, and the single phase coolant outflow of the stack is divided to provide just enough water to be flashed into sufficient steam for the reformer, the rest of the single phase coolant outflow being fed directly to heat recovery and utilization apparatus.

The invention not only avoids the necessity for complex coolant flow control devices, it also avoids processing all of the coolant outflow through the steam recovery apparatus prior to recovering the energy in the heat of the coolant outflow.

Other objects, features and advantages of the present invention will become more apparent in light of the following detailed description of exemplary embodiments thereof, as illustrated in the accompanying drawing.

MODE(S) FOR CARRYING OUT THE INVENTION

Figure 1:
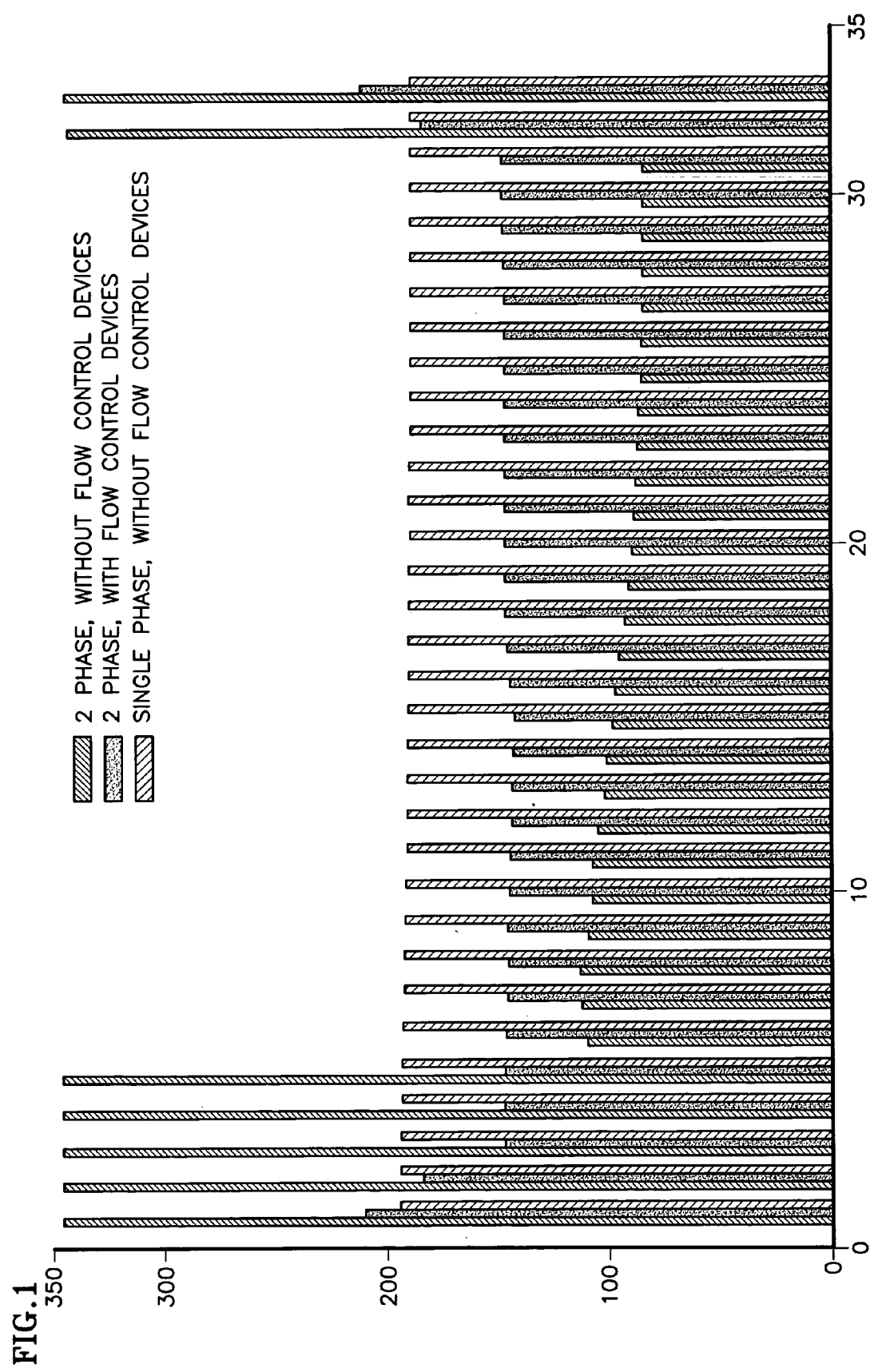
FIG. 1 is a bar chart illustrating distribution of inlet coolant.
Figure 2:
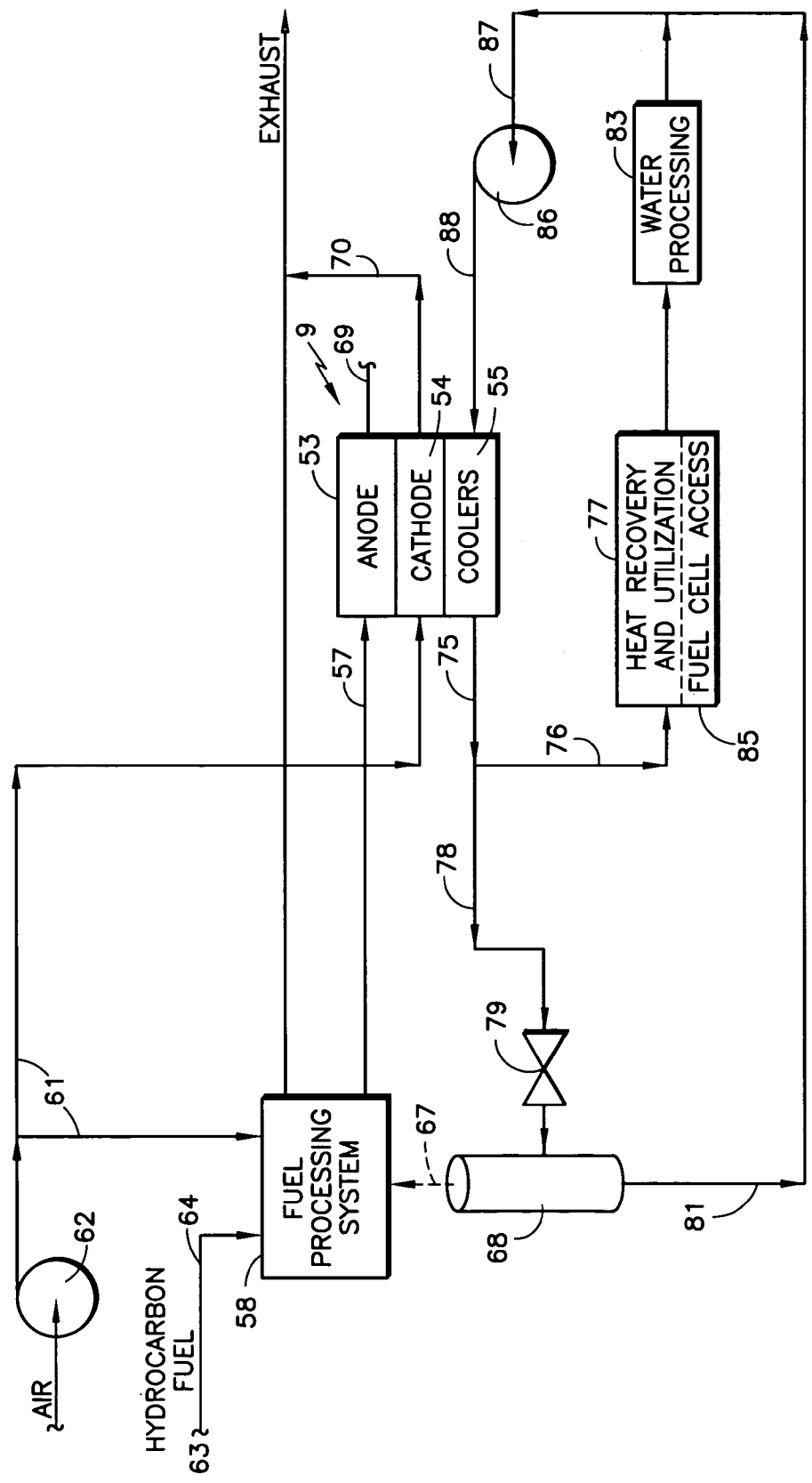
FIG. 2 is a simplified, stylized block diagram of a fuel cell system having a single phase coolant, with coolant outflow divided to produce steam, reduce parasitic power of the coolant pump, and improve heat recovery.

Referring to FIG. 2, the present invention uses single phase coolant, such as water, rather than dual phase coolant, such as a water/steam mixture. Because a single phase coolant is used, the outflow from the coolant flow channels can be divided so that only an amount of coolant water necessary for fuel processing is flashed into steam, the remainder of the coolant flow being directly applied to the heat recovery and utilization apparatus. If the coolant stream were sent to the heat recovery and utilization apparatus after flashing the stream to provide reformer steam, rather than before, the temperature of the stream would be lower resulting in tighter pinches and lower heat abstraction for a given design of the heat recovery and utilization apparatus. In addition, since the heat recovery and utilization apparatus poses an additional pressure drop on the stack coolant stream, pump parasitic power would be higher. Dividing the coolant stream to flash an amount of coolant into steam for the reformer, while sending the balance directly to the heat recovery and utilization apparatus, avoids these problems and results in higher heat abstraction from the heat recovery and utilization apparatus and lower coolant pressure drop and parasitic power.

A simplified schematic illustration of heat recovery, in a system having a fuel cell employing the present invention, is illustrated in FIG. 2. Therein, the fuel cell stack 9 includes anodes 53, cathodes 54 and coolers 55 as well as the electrode assembly of each fuel cell, not shown. The anodes 53 are fed hydrogen-containing reformate fuel over a conduit 57 from a fuel processing system 58, which may, for instance, be a steam reforming reactor. The fuel processing system utilizes air on a conduit 61 from an air pump 62, hydrocarbon fuel from a source 63 in a conduit 64, and steam from a steam generator including a steam drum 68. The anode exhaust 69 may include conventional fuel recycle and purging functions, which are not germane to the invention and are omitted herein for clarity.

The cathodes receive air in the conduit 61, the outflow of which is provided by the conduit 70 to exhaust. If desired, there may be a heat recovery system on the air exhaust, such as with an ancillary coolant system; however, that is not germane to the invention and is omitted herein for clarity.

In accordance with the invention, the coolant leaving the cooler plates 55, through a conventional coolant outlet manifold (not shown), in a conduit 75, is divided so that a portion of it flows through a conduit 76 directly to the heat recovery and utilization apparatus 77, while a small portion is provided over a conduit 78 through a restriction 79 that flashes the water into steam within the steam drum 68, which together comprise a steam generator. Some of the water flashed into the steam drum is not converted to steam but flows as water through a conduit 81 to return to the coolers 55.

The heat recovery and utilization apparatus 77 may be fuel cell powerplant accessories 85, such as any device that increases the thermal efficiency of the fuel cell system. Examples are single and double effect absorption chillers, or a heat exchanger, the heat receiving side of which, would provide domestic hot water for consumption by the customer, pressurized hot water for hydronic heating of customer living space or boiler preheat which would be used for producing steam for some other application.

Within the coolant flow system there may be various water processing functions 83, such as deionization and temperature management, which are not germane to the invention and not described further herein. Water enters a coolant pump 86 through a conduit 87, the pump output flowing through a conduit 88 to a simple coolant inlet manifold (not shown) of the coolers 55, without flow control devices. Single phase coolant is achieved by operating the coolant pump 86 at a pressure which is above the saturation pressure of the coolant at the temperature of the coolant within the cooler plates 55.

In the prior art, all of the coolant flows through the restriction 78 and to the steam drum 68, the recovery of heat for useful purposes being taken from the conduit 81 exiting the steam drum. This requires a pump drawing water directly from the steam drum, which consumes more of the energy generated by the fuel cell, thus representing a significant parasitic power cost. In contrast, the invention divides the flow between the conduits 76 and 78, the conduit 78 receiving only sufficient water to provide an appropriate amount of steam to the fuel processing system, the remainder of the water being provided directly to the heat recovery and utilization apparatus 77, so that it has more energy, and requires less pump energy. This either increases the overall coefficient of performance (COP) of the heat recovery and utilization apparatus or allows higher temperatures to be achieved in the utilization equipment when employing the present invention.

All of the aforementioned patents are incorporated herein by reference.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

We claim:

1. A fuel cell and heat recovery system comprising:
   a plurality of fuel cells interspersed with a plurality of cooler plates in a stack;
   a coolant pump providing single phase coolant through said plurality of cooler plates at a pressure above the saturation pressure of the coolant at the temperature of the coolant within said cooler plates;
   a hydrocarbon fuel reforming system for providing reformate fuel to said fuel cell stack;
   a steam generator for providing steam to said reforming system, said steam generator comprising a steam drum and a flow restriction at the inlet of said steam drum which flashes water into steam;
   heat recovery and utilization apparatus; and
   means for dividing the outflow of coolant exiting from said cooler plates to direct sufficient coolant to said steam generator so as to provide adequate steam to said fuel reforming system to generate sufficient reformate fuel for said fuel cell stack, the remainder of the outflow of coolant from said cooler plates being applied directly to said heat recovery and utilization apparatus.

2. A system according to claim 1 wherein said heat recovery and utilization apparatus comprises fuel cell power plant accessories.

3. A fuel cell and heat recovery system, comprising:
   a plurality of fuel cells interspersed with a plurality of cooler plates in a stack;
   a coolant pump providing single phase coolant through said plurality of cooler plates at a pressure above the saturation pressure of the coolant at the temperature of the coolant within said cooler plates;
   a hydrocarbon fuel reforming system for providing reformate fuel to said fuel cell stack;
   a steam generator for providing steam to said reforming system, said steam generator comprising a steam drum and a flow restriction at the inlet of said steam drum which flashes water outflow from said cooler plates, at a pressure above the saturation pressure of said coolant at the temperature of said coolant directed to said steam drum, into steam;
   heat recovery and utilization apparatus; and
   means for dividing the outflow of coolant exiting from said cooler plates to direct sufficient coolant to said steam generator, at a pressure above the saturation pressure of said coolant at the temperature of said coolant directed to said steam generator, so as to provide adequate steam to said fuel reforming system to generate sufficient reformate fuel for said fuel cell stack the remainder of the outflow of coolant from said cooler plates being applied directly to said heat recovery and utilization apparatus at a pressure above the saturation pressure of said coolant at the temperature of said coolant directed to said apparatus.

* * * * *